(12) United States Patent
Urano et al.

(10) Patent No.: US 6,969,742 B2
(45) Date of Patent: *Nov. 29, 2005

(54) METHOD OF PRODUCING A FUNCTIONAL POLYMER PARTICLE

(75) Inventors: Chisato Urano, Minamiashigara (JP); Yoshihiro Inaba, Minamiashigara (JP); Masato Mikami, Minamiashigara (JP); Takako Kobayashi, Minamiashigara (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/389,918

(22) Filed: Mar. 18, 2003

(65) Prior Publication Data

US 2004/0039109 A1 Feb. 26, 2004

(30) Foreign Application Priority Data

Aug. 21, 2002 (JP) ........................ 2002-240372

(51) Int. Cl.⁷ ..................... C08F 8/32; C08F 220/34
(52) U.S. Cl. ................. 525/326.7; 525/374; 524/548; 524/555; 526/262; 526/347
(58) Field of Search ............... 525/326.7, 374; 524/548, 555; 526/262, 347

(56) References Cited

U.S. PATENT DOCUMENTS

| | | | | |
|---|---|---|---|---|
| 4,070,348 A | | 1/1978 | Kräemer et al. | |
| 5,200,462 A | * | 4/1993 | Sutton et al. | 524/548 |
| 5,308,749 A | | 5/1994 | Sutton et al. | |
| 6,203,956 B1 | * | 3/2001 | Urano et al. | 430/111.4 |
| 6,413,691 B2 | * | 7/2002 | Daimon et al. | 430/109.4 |
| 2004/0034174 A1 | | 2/2004 | Urano et al. | |
| 2004/0039109 A1 | | 2/2004 | Urano et al. | |

FOREIGN PATENT DOCUMENTS

| | | |
|---|---|---|
| JP | A 58-106554 | 6/1983 |
| JP | A 58-219455 | 12/1983 |
| JP | A 63-90521 | 4/1988 |
| JP | A 63-191805 | 8/1988 |
| JP | A 63-191818 | 8/1988 |
| JP | A 64-33111 | 2/1989 |
| JP | A 2-166102 | 6/1990 |
| JP | A 4-323213 | 11/1992 |
| JP | A 5-216049 | 8/1993 |
| JP | A 10-310603 | 11/1998 |
| JP | B2 3238736 | 10/2001 |

* cited by examiner

Primary Examiner—Tatyana Zalukaeva
(74) Attorney, Agent, or Firm—Oliff & Berridge, PLC

(57) ABSTRACT

The present invention relates to a method of producing a functional polymer particle having at least one kind of functional group selected from the following structure group (A), which comprises the step of reacting a non-crosslinked polymer particle having a succinimidoxycarbonyl group with a compound having at least one kind of functional group selected from the following structure group (A) and at least one functional group selected from the group consisting of a primary amino group and a secondary amino group:

Structural group (A)

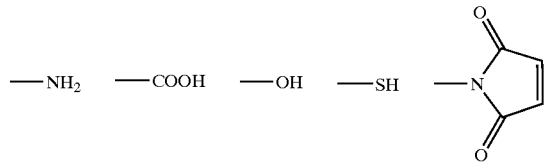

19 Claims, No Drawings

METHOD OF PRODUCING A FUNCTIONAL POLYMER PARTICLE

BACKGROUND OF THE INVENTION

1. Field of the Invention

The present invention relates to a method of producing a functional polymer particle.

2. Description of the Related Art

Conventionally, polymer particles having a particle diameter in the range of about 0.01 to 50 μm are useful as spacers, standard particles, particles for examination of antigen-antibody reaction, catalyst particles, particles for combinatorial chemistry, toner additives, cosmetic additives, rheology controlling agents, low profile additives, improvers for resin mechanical properties, antiblocking agents for resin film, film lubricants, running stabilizers for thermoseisitive paper, etc. and are used in various fields. In recent years, the performance required of fine resin particles varies widely from the type of functional groups in the particles, the shape of the particles, the uniformity of particle diameters, the strength of the particles, heat resistance, etc.

In particular, there is great demand for the uniformity of particle diameters. For example, fine resin particles are often used as spacers in a liquid crystal display panel, to maintain a constant clearance between two glass substrates constituting the panel. However, if the particle size distribution of the fine particles is broad, spacer particles having particle diameters smaller than the central particle diameter move and easily become unevenly distributed in the space between the two glass substrates. Further, another problem occurs, in that spacer particles larger than the central particle diameter are easily destroyed. Accordingly, fine resin particles having a narrow distribution of particle diameters are required.

The polymer particles having particle diameters in such a range can be produced usually by granulation in an aqueous solvent according to an emulsion polymerization method or a suspension polymerization method. As the method of producing particles containing an hydrophilic group such as an amino group, a hydroxyl group and a carboxyl group, a method of emulsion polymerization or suspension polymerization using a polymerizable monomer containing a hydrophilic group can be mentioned as a first method. A method of granulating a polymerizable monomer having a hydrophilic group, to which a protective group is attached, through emulsion polymerization or suspension polymerization and then eliminating the protective group can be mentioned as another method of producing particles containing hydrophilic groups. In the first method, however, the polymerizable monomer is hydrophilic, and thus a proportion of the hydrophilic monomer in the resulting hydrophilic monomer-hydrophobic monomer copolymer can be lower than the proportion of the hydrophilic monomer in the starting materials charged, and further the yield is reduced. In the other method, even if particles having the same composition as in the starting materials can be produced in high yield, a procedure, which eliminate the protective group, is later required.

Moreover, in cases in which the polymerizable monomer, having a hydrophilic group, to which a protective group is attached, is not commercially available, a synthesis attaching the protective group to the hydrophilic group must be performed. The steps for this synthesis are numerous and are not simple. Thus increasing the steps and making the another method difficult (Japanese Patent Application Laid-Open (JP-A) No. 2-166102). In JP-A No. 58-219455, emulsion polymerization is carried out using persulfate as an initiator, to introduce a functional group into a catalytic fragment in the resulting polymer. In this method, however, particles having a large diameter cannot be obtained, and introduction of many functional groups is difficult. In JP-A No. 5-216049, after particles (seed particles) are prepared by suspension polymerization, polymerizable monomers having functional groups are absorbed into the particles, and seed polymerization is performed to produce particles having the functional groups, which were introduced thereinto. However, when the particles are produced by suspension polymerization, it is difficult to obtain particles of the desired particle diameter with a good particle size distribution, so a classification procedure is required to obtain particles of narrow particle size distribution, thus reducing the yield. Further, there is a disadvantage that at the time of seed polymerization, unabsorbed polymerizable monomers can form undesired fine particles, or swollen particles might aggregate to form coarse particles, and broaden the particle size distribution.

In JP-A No. 63-90521, a polymerizable monomer having an active functional group is used to produce particles by dispersion polymerization. However, this prior art literature describes the particle diameter but does not describe the particle size distribution thereof. In JP-A No. 64-33111, a polymerizable monomer having an active functional group and a crosslinking polymerizable monomer are subjected to dispersion polymerization to produce particles. However, as the ratio of the crosslinking monomer is increased, the stability of the polymerization reaction system is greatly deteriorated, thus making it difficult to produce particles of a narrow particle size distribution with the desired particle diameter. Further, there was the problem of a reduction in the reactivity of the active functional group in the crosslinked particles. Conventionally, it has been difficult to produce polymer particles having a hydrophilic functional group with a good particle size distribution by an easy process.

SUMMARY OF THE INVENTION

The object of the present invention is to provide a method of producing a functional polymer particle wherein functional polymer particles having functional groups as functional elements, such as hydrophilic functional groups, can be obtained easily and efficiently in a narrower particle size distribution.

This object can be achieved by the following means:

The invention relates to a method of producing a functional polymer particle having at least one kind of functional group (functional group A) selected from the following structure group (A), the method comprising the step of reacting a non-crosslinked polymer particle, which includes a succinimidoxycarbonyl group (functional group B) represented by the following structural formula (B) with a compound, which includes at least one kind of functional group (functional group A) selected from the following structure group (A) and at least one functional group selected from the group consisting of a primary amino group and a secondary amino group:

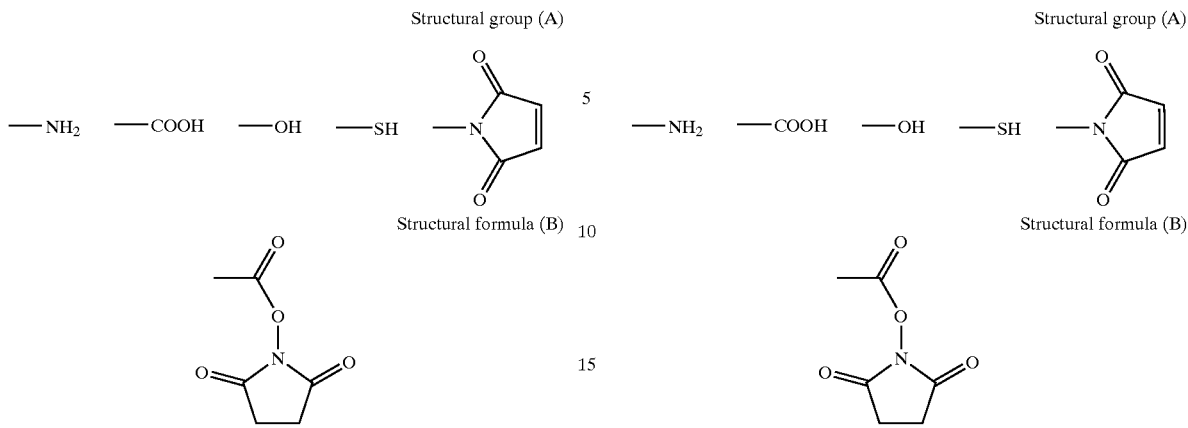

The compound, which includes at least one kind of functional group (functional group A) selected from the abovementioned structure group (A) and at least two functional groups selected from the group consisting of a primary amino group and a secondary amino group, may be used as the compound, which includes at least one kind of functional group (functional group A) selected from the abovementioned structure group (A) and at least one functional group selected from the group consisting of a primary amino group and a secondary amino group, to produce functional polymer particles having a crosslinked structure.

In the invention, the non-crosslinked polymer particle may be those produced by polymerizing 0.1 to 100% by mole of a polymerizable monomer (C), which contains a succinimidoxycarbonyl group represented by the abovementioned structural formula (B) and 99.9 to 0% by mole of a polymerizable monomer (D), which contains one polymerizable moiety in the monomer, by using a initiator in the presence of a macromolecular dispersion stabilizer in a non-aqueous solvent. In this process, the non-aqueous solvent is a solvent in which the polymerizable monomer (C) and the polymerizable monomer (D) are soluble and the non-crosslinked polymer particle is insoluble.

In the invention, the polymerizable monomer (C) may be at least one type selected from the group consisting of N-acryloxysuccinimide and N-methacryloxysuccinimide.

In the invention, it is preferable that a number average particle diameter of the functional polymer particles is 0.01 to 50 μm, and a coefficient of variation of the number average particle diameter is 0.01 to 30%.

DESCRIPTION OF THE INVENTION

Hereinafter, the present invention will be described in detail.

The invention relates to a method of producing a functional polymer particle having at least one kind of functional group (functional group A) selected from the following structure group (A), the method comprising the step of reacting a non-crosslinked polymer particle, which includes a succinimidoxycarbonyl group (functional group B) represented by the following structural formula (B), with a compound, which includes at least one kind of functional group (functional group A) selected from the following structure group (A) and at least one functional group selected from the group consisting of a primary amino group and a secondary amino group:

Non-Crosslinked Polymer Particle

The non-crosslinked polymer particle used in the invention is not particularly limited, but is preferably those produced by polymerizing 0.1 to 100% by mole of a polymerizable monomer (C), which contains a succinimidoxycarbonyl group represented by the abovementioned structural formula (B), and 99.9 to 0% by mole of a polymerizable monomer (D), which contains one polymerizable moiety in the monomer, by using a initiator in the presence of a macromolecular dispersion stabilizer in a non-aqueous solvent. The non-aqueous solvent used in this case is a solvent in which the polymerizable monomer (C) and the polymerizable monomer (D) are soluble and the non-crosslinked polymer particle is insoluble.

The polymerizable monomer (C) is not particularly limited insofar as it is a monomer having a succinimidoxycarbonyl group represented by the abovementioned structural formula (B) and one radical-polymerizable unsaturated group, and particularly N-acryloxysuccinimide and N-methacryloxysuccinimide are preferable because they can be easily produced.

One kind of the polymerizable monomer (C) can be used, or two or more kinds thereof can be simultaneously used.

As the polymerizable monomer (D), a polymerizable monomer having one polymerizable moiety in the molecule thereof can be used. The polymerizable monomer (D) is not particularly limited insofar as it is a polymerizable monomer having one radical-polymerizable unsaturated group (polymerizable site) in the molecule, and examples thereof include styrene monomers such as styrene, methylstyrene, ethylstyrene, chlorostyrene, styrenesulfonic acid and t-butoxystyrene; (meth)acrylic ester monomers such as methyl acrylate, methyl methacrylate (hereinafter, acryl and methacryl are referred collectively as (meth)acryl) such as ethyl (meth)acrylate, n-propyl (meth)acrylate, i-propyl (meth)acrylate, n-butyl (meth)acrylate, 2-ethylhexyl (meth) acrylate, lauryl (meth)acrylate, glycidyl (meth)acrylate, dimethylaminoethyl (meth)acrylate, hydroxyethyl (meth) acrylate, diethylene glycol mono(meth)acrylate, polyethylene glycol mono(meth)acrylate and butanediol mono(meth) acrylate; unsaturated carboxylic acid monomers such as (meth)acrylic acid and maleic acid; alkyl vinyl ether monomers such as methyl vinyl ether and ethyl vinyl ether; vinyl ester monomers such as vinyl acetate and vinyl butyrate; (meth)acrylamide monomers such as (meth)acrylamide, N-methyl(meth)acrylamide and N-ethyl(meth)acrylamide; and nitrile monomers such as (meth)acrylonitrile.

The polymerizable monomer (D) is preferably methyl methacrylate. One kind of the polymerizable monomer (D) can be used, or two or more kinds thereof can be simultaneously used.

The compounding ratio of the polymerizable monomer (C) to the polymerizable monomer (D) is determined such that the polymerizable monomer (C) is 0.1 to 100% by mole and the polymerizable monomer (D) is 99.9 to 0% by mole, preferably the polymerizable monomer (C) is 0.1 to 50% by mole and the polymerizable monomer (D) is 99.9 to 50% by mole, particularly preferably the polymerizable monomer (C) is 0.1 to 20% by mole and the polymerizable monomer (D) is 99.9 to 80% by mole.

When two or more compounds are used simultaneously as the polymerizable monomer (C) or the polymerizable monomer (D), the compounding ratio of the polymerizable monomer (C) to the polymerizable monomer (D) refers to the ratio of the total number of moles of the polymerizable monomer (C) to the total number of moles of the polymerizable monomer (D).

The macromolecular dispersion stabilizer (also hereinafter referred to as dispersion stabilizer) used in the invention may be any macromolecular dispersion stabilizer, but preferably a macromolecular dispersion stabilizer having a weight average molecular weight of 10,000 to 2,000,000 is used. Examples thereof include polyvinyl alcohol, partially saponified polyvinyl acetate, polyvinyl pyrrolidone, polyvinyl acetamide, poly(meth)acrylic acid, poly(meth)acrylate, poly(meth)acrylic acid-poly(meth)acrylate copolymers, poly(meth)acrylic acid-vinyl ether copolymers, polyvinyl alkyl ethers, poly(meth)acrylic acid-styrene copolymers and polystyrenesulfonic acid, and cellulose derivatives such as methyl cellulose, ethyl cellulose, hydroxyethyl cellulose, hydroxypropyl cellulose and carboxymethyl cellulose.

Among these, polyvinyl pyrrolidone, hydroxypropyl cellulose, polyvinyl acetamide, polyvinyl alkyl ethers, polyvinyl alcohol and partially saponified polyvinyl acetate are preferable. One kind of the macromolecular dispersion stabilizer can be used, or two or more kinds thereof can be simultaneously used.

The amount of the dispersion stabilizer to be added is preferably 0.1 to 25% by mass, particularly preferably 0.5 to 15% by mass, relative to the total amount of the non-aqueous solvent.

When the non-crosslinked polymer particle is produced, various surface active agents may further be added. Examples thereof include anionic surface active agents such as sodium dodecylbenzenesulfonate, sodium laurylsulfate and sodium alkyldiphenyldisulfonate, and nonionic surface active agents such as polyoxyethylene nonyl phenyl ether.

The amount of the surface active agent to be added is preferably 0 to 25% by mass, particularly preferably 0 to 15% by mass, relative to the total amount of the non-aqueous solvent.

When the non-crosslinked polymer particle is produced, a redox type compound can also be added. The redox type compound to be used is not particularly limited insofar as it has an oxidizing or reducing ability. Examples thereof include ascorbic acid, isoascorbic acid, tocopherol, hydroquinone, catechol and resorcin. The amount of the redox type compound to be used is usually 0 to 10.0 parts by mass, preferably 0 to 5.0 parts by mass, based on 100 parts by mass of the polymerizable monomers in total.

The initiator used in the invention is not particularly limited insofar as it is a radical polymerization initiator dissolved in the solvent (non-aqueous solvent) described later. Typical examples thereof include peroxides such as t-butyl peroxide, t-amyl peroxide, cumyl peroxide, acetyl peroxide, propionyl peroxide, benzoyl peroxide, lauroyl peroxide, t-butyl hydroperoxide, cyclohexyl hydroperoxide, t-butyl peracetate and t-butyl perbenzoate, as well as azo compounds such as 2,2'-azobisisobutyronitrile (AIBN), dimethyl 2,2'-azobisisobutyrate, 2,2'-azobis(2,4-dimethylvaleronitrile), 2,2'-azobis[2-methyl-N-(2-hydroxyethyl)propionamide].

These initiators are used in an amount of usually 0.01 to 50 parts by mass, preferably 0.1 to 10 parts by mass, relative to 100 parts by mass of the polymerizable monomers in total.

The non-aqueous solvent used in the invention is a solvent in which generally the polymerizable monomers as the starting material are soluble and the non-crosslinked polymer particles as the product are insoluble. The non-aqueous solvent include, for example, alcohols having 1 to 6 carbon atoms, ketones, esters, and cellosolves.

The alcohols having 1 to 6 carbon atoms include alcohols such as methanol, ethanol, iso-propyl alcohol, n-propyl alcohol, iso-butyl alcohol, sec-butyl alcohol, tert-butyl alcohol, iso-amyl alcohol, sec-amyl alcohol and tert-amyl alcohol.

The ketones include acetone, methyl ethyl ketone, etc. The esters include ethyl acetate, butyl acetate, etc. Cellosolves include methyl cellosolve, ethyl cellosolve, propyl cellosolve, butyl cellosolve, etc.

Among these solvents, use is made of preferably methanol and ethanol, particularly preferably methanol.

In the polymerization reaction in the invention, one kind of the non-aqueous solvent may be used, or two or more thereof may be simultaneously used. When two or more thereof are simultaneously used, a combination of alcohols and cellosolves is one preferable example.

The non-crosslinked polymer particle is produced by polymerizing the polymerizable monomers by using the initiator in the presence of the macromolecular dispersion stabilizer in the non-aqueous solvent. The polymerization proceeds initially in a solution, in which the polymerizable monomers are dissolved in a solvent, and as the polymerization proceeds, the formed non-crosslinked polymer particles come to precipitate from the solvent.

The polymerization temperature is in the range of generally 20 to 120° C., preferably 50 to 100° C. If oxygen is present in a large amount in the system of the polymerization reaction, the polymerization reaction is influenced thus failing to yield uniform fine spherical polymer particles with good reproducibility. Accordingly, the atmosphere in the polymerization system is preferably substituted as much as possible by an inert gas such as nitrogen gas, and materials such as the starting materials to be polymerized are handled preferably in an inert gas atmosphere.

Under the polymerization conditions described above, the spherical copolymer having a succinimidoxycarbonyl group in the form of truly spherical particles having an extremely narrow distribution of particle diameters can be obtained in high yield. The particle characteristics of the resulting non-crosslinked polymer particle is that the number average particle diameter is usually 0.01 to 50 $\mu$m, preferably 0.01 to 20 $\mu$m and the coefficient of variation of the average particle diameter as an indicator of the particle size distribution is 0.01 to 30%. The coefficient of variation is preferably 0.01 to 10%, more preferably 0.01 to 5%.

The average particle diameter of the functional polymer particle obtained in the invention and the coefficient of variation thereof depend on the average particle diameter of the non-crosslinked polymer particle and the coefficient of variation thereof and show approximately similar numerical values to those of the non-crosslinked polymer particle.

The coefficient of variation of the number average particle diameter as an indicator of the particle size distribution is defined as follows: On the basis of data on the particle diameters and the number average particle diameter, the standard deviation is determined. The standard deviation has the unit of length ($\mu$m), and its value is also influenced by the magnitude of the number average particle diameter, so the standard deviation is divided by the number average particle diameter and multiplied by 100. The non-dimensional value thus obtained is used as the coefficient of variation (%) of the number average particle diameter.

Functional Polymer Particle

The functional polymer particle of the invention is produced by reacting the non-crosslinked polymer particle described above with a compound, which includes at least one kind of functional group (functional group A) selected from the abovementioned structure group (A) and at least one functional group selected from the group consisting of a primary amino group (—NH$_2$) and a secondary amino group (—NH—) (hereinafter, this compound is referred to as the amine compound having the functional group A).

Specifically, the amine compound having the functional group A includes aliphatic compounds, alicyclic compounds, aromatic compounds and combined compounds thereof, each having at least one kind of functional group (functional group A) selected from the abovementioned structure group (A) and at least one functional group selected from the group consisting of a primary amino group and a secondary amino group. Polyamines can also be preferably used.

A compound, which includes at least one kind of functional group (functional group A) selected from the abovementioned structure group (A) and at least two functional groups selected from the group consisting of a primary amino group and a secondary amino group is preferably used as the amine compound having the functional group A, because the resulting functional polymer particles have formed a crosslinked structure, to serve as particles with improvements in heat resistance and durability.

Preferable examples of the amine compound having the functional group A are as follows:

As aliphatic polyvalent amines, mention is made of ethylene diamine, propylene diamine, butylene diamine, hexamethylene diamine, diethylene triamine, triethylene tetramine, tetraethylene pentamine, dipropylene triamine, N-methylpropylene diamine, 2,2-diaminomethyl-1-butylamine, N-(2-acetamido)-2-iminodiacetyl acid, aminobenzyl-EDTA, bis(aminomethyl)cyclohexane, 1,4-diaminocyclohexane, bis-(4-aminocyclohexyl)-methane, 1-amino-3,3,5-trimethyl-5-aminomethyl cyclohexane (isophoronediamine), hexamethylenediamine carbamate, N,N'-dicinnamylidene-1,6-hexanediamine, adipic dihydrazide, etc.

As aromatic polyvalent amines, mention is made of 4,4'-diaminodiphenyl methane, 4,4'-diaminodiphenyl sulfone, 4,4'-methylene dianiline, m-phenylene diamine, 4,4'-diaminodiphenyl ether, 3,4'-diaminodiphenyl ether, 4,4'-(m-phenylene diisopropylidene)dianiline, 4,4'-(p-phenylene diisopropylidene)dianiline, dianiline, 2,2'-bis[4-(4-aminophenoxy)phenyl]propane, 4,4'-diaminobenzanilide, 4,4'-bis(4-aminophenoxy)biphenyl, m-xylylene diamine, p-xylylene diamine, 1,3,5-benzene triamine, 1,3,5-benzene tri(aminomethyl), 3,3'-diaminobenzidine tetrahydrochloride, 3,3',5,5'-tetramethyl benzidine, 2,3-diaminonaphthalene, piperazine, N-aminoalkyl piperazine (e.g. N-aminoethyl piperazine, N-aminopropyl piperazine etc.), polyether polyamine having a molecular weight of 200 to 2,000 (e.g. polyoxypropylene diamine having an amino group at each of the terminals etc.), polyamide polyamine compounds obtained by condensation of aliphatic polycarboxylic acid (e.g. adipic acid, sebacic acid, polymerizable aliphatic acid, etc.) and polyalkylene polyamine (polyalkylene polyamine mentioned above) and if necessary aliphatic monocarboxylic acid ($C_{1-20}$ aliphatic monocarboxylic acid such as acetic acid, propionic acid, oleic acid, etc.).

As carboxyl group-containing amines, N-(2-acetamide) iminodiacetyl acid and amino acids can also be used, and mention is made of glutamic acid, glutamine, histidine, histidine hydrochloride, lysine, lysine hydrochloride, ornithine, arginine, arginine hydrochloride, nitroarginine, phenylarginine, tyrosine, diiodotyrosine, tiyptophan, glycine, alanine, valine, leucine, isoleucine, serine, threonine, cystine, methionine, proline, oxyproline, asparagine, aspartic acid and polyamino acid, etc.

As hydroxyl group-containing fatty amines, mention is made of monoethanolamine, diethanolamine, isopropanolamine, diisopropanolamine, isobutanolamine, diisobutanolamine, triethanolamine, hydroxyethylaminomethyl alcohol, 2-(2-aminoethylamino)ethanol, monoethylene glycol amine, diethylene glycol amine, 2,2-diaminomethyl-1-butanol, polyethylene glycol amine, etc.

As thiol group-containing amines, mention is made of 2-aminoethanethiol, 6-amino-1-hexanethiol hydrochloride, 8-amino-1-octanethiol hydrochloride, 11-amino-1-undecanethiol hydrochloride, and thiol group-containing amino acids such as cysteine.

As maleimide group-containing amines, mention is made of N-(4-aminophenyl)maleimide, N-[2-(1-piperazinyl) ethyl]maleimide dihydrochloride, N-(4-anilino-1-naphthyl) maleimide, etc.

The compounding ratio of the non-crosslinked polymer particle to the amine compound having the functional group A is determined preferably such that an amount of the amine compound added is at least enough for amino groups of the amine compound, which are capable of reaction, to react with all succinimidoxycarbonyl groups in the non-crosslinked polymer particle. One kind of the amine compound having the functional group A can be used, or two or more kinds thereof can be simultaneously used.

As the solvent used in the reaction of the non-crosslinked polymer particle with the amine compound having the functional group A, use is made of a solvent not solubilizing the non-crosslinked polymer particles (the resulting functional polymer particles) and not reacting with succinimide groups, the functional group A and amino groups.

Such solvent may be any non-aqueous solvent, and examples thereof include alcohols having 1 to 6 carbon atoms, ketones, esters, and cellosolves, etc.

The alcohols having 1 to 6 carbon atoms include alcohols such as methanol, ethanol, iso-propyl alcohol, n-propyl alcohol, iso-butyl alcohol, sec-butyl alcohol, tert-butyl alcohol, iso-amyl alcohol, sec-amyl alcohol and tert-amyl alcohol.

The ketones include acetone, methyl ethyl ketone, etc. The esters include ethyl acetate, butyl acetate, etc. Cellosolves include methyl cellosolve, ethyl cellosolve, propyl cellosolve, butyl cellosolve etc. Hexane or the like can also be used.

Among these solvents, methanol, ethanol and hexane are preferable. One kind of the solvents can be used, or two or more kinds thereof can be simultaneously used.

In the reaction of the non-crosslinked polymer particle with the amine compound having the functional group A, the particle is allowed to react with the amine compound under stirring in the non-aqueous solvent. The reaction proceeds rapidly under moderate conditions and is completed in about 1 hour at ordinary temperatures.

In the invention, the non-crosslinked polymer particle is allowed to react with the amine compound having the functional group A, whereby the functional polymer particle can be produced easily in high yield in a narrow particle size distribution. Further, if the non-crosslinked polymer particle having the specific particle properties described above is used as the non-crosslinked polymer particles as the starting material or the process described above is used for producing the particles, the desired functional polymer particles can be obtained more efficiently in higher yield in a narrower particle size distribution.

The resulting functional polymer particle can be used preferably in various uses such as spacers in a liquid crystal display panel, electrophotographic toners, carriers for diagnostic reagents, chromatographic adsorbents, cosmetic fillers, and coating agents.

EXAMPLES

Hereinafter, the invention will be described in more detail by reference to the Examples, but these are shown merely for illustrative purposes and not intended to limit the invention.

The respective measurement values in the Examples were obtained in the following manner.
(1) Measurement of particle diameters and calculation of the number average particle diameter: 200 polymer particles obtained by polymerization reaction were arbitrarily selected from a picture taken by an optical microscope, their respective particle diameters were measured, and the average number particle diameter was calculated.
(2) Calculation of the standard deviation and the coefficient of variation: On the basis of the data on particle diameters obtained above, the standard deviation ($\mu$m) as an indicator of the particle size distribution was determined. Further, the standard deviation was divided by the number average particle diameter and then multiplied by 100, to calculate the non-dimensional coefficient of variation (%).
(3) Analysis of the composition of the polymer particle: The composition of the polymer particle was analyzed by $^1$H NMR (300 MHz, manufactured by Varian). As the solvent for the measurement, $CDCl_3$ was used.
(4) Measurement of the amount of functional groups in the polymer particle: The amounts of carboxyl and hydroxyl groups in the particle were measured by a method described in JIS-K0070. The amount of amino groups was measured by a method described in JIS-K7237. For quantification of SH groups, SH group-containing polymer particles were reacted with 4,4'-dithiodipyridine, and 4-thiopyridone formed after the reaction was determined by measuring the absorbance at 324 nm (molar absorption coefficient $\epsilon_{324\ nm}$=19800 ($M^{-1} \cdot cm^{-1}$)), to quantify the SH groups. For quantification of maleimide groups, maleimide group-containing polymer particles were reacted with an excess of 2-mercaptoethylamine, then an excess thereof after the reaction was reacted with 4,4'-dithiodipyridine, and 4-thiopyridone formed after the reaction was determined by measuring the absorbance at 324 nm ($\epsilon_{324\ nm}$=19800 ($M^{-1} \cdot cm^{-1}$)), to quantify the maleimide groups.

Example 1

Preparation of Amine Particles
Preparation of the Non-crosslinked Polymer Particle Containing Succinimidoxycarbonyl Groups A separable four-necked flask of Pyrex (registered trade mark) glass having a volume of 300 ml was used as a reaction vessel, and a cooling pipe equipped in an upper part with a nitrogen gas exhaust tube, and a nitrogen gas inlet tube, were mounted to the reaction vessel. Stirring was conducted using a magnetic stirrer made of iron coated with Teflon (registered trade mark) and an electromagnetic external stirring device. The reaction vessel was arranged on an oil bath.

75 g methanol solution containing 2.2% by mass of a macromolecular dispersion stabilizer polyvinyl pyrrolidone (PVP) having a molecular weight (Mw) of 360,000 was introduced into the reaction vessel substituted with nitrogen. Then, 21 g (90% by mole) of methyl methacrylate (MMA) purified by vacuum distillation, 4.0 g (10% by mole) of N-acryloxy succinimide (AS), and 0.25 g of an initiator azobisisobutyronitrile (AIBN) were introduced successively into the reaction vessel. A nitrogen gas was blown through the nitrogen gas inlet tube for 2 hours into the liquid phase under stirring, to remove oxygen dissolved therein. Then, the nitrogen gas inlet tube for the liquid phase was replaced by a nitrogen gas inlet tube for gas phase, and while a nitrogen gas was blown into it, the mixture was reacted for 16 hours at a reaction temperature of 55° C.

As a result, non-crosslinked polymer particles having the number average particle diameter of 6.1 $\mu$m were obtained in a yield of 91% by mass. The standard deviation as an indicator of the particle size distribution and the coefficient of variation thereof of the polymer particles were 1.3 $\mu$m and 23%, respectively. As a result of analysis of the composition by $^1$H NMR, the ratio of MMA: AS compounded in the polymer particles was 90:10 which was the same as in the starting materials charged.

Reaction for Introducing Functional Groups 10 g of the non-crosslinked polymer particle containing succinimidoxycarbonyl groups prepared above and 200 ml methanol were introduced into a 500 ml beaker. While the mixture was stirred by a mechanical stirrer, 20 ml ethylene diamine was added thereto and stirred for 30 minutes.

After reaction for 30 minutes, the particles were separated from the solution by a Kiriyama funnel (filter paper 5B). The particles and 100 ml methanol were introduced into a 500 ml beaker and stirred for 10 minutes, and the particles were washed on a filter. This washing was repeated twice.

The amount of amino groups in the particles after introduction of the functional groups was determined to be 5.3 mmole/g. The functional polymer particle was thus obtained.

The number average particle diameter of the resulting functional polymer particles, the standard deviation as an indicator of the particle size distribution and the coefficient of variation were almost the same as those of the non-crosslinked polymer particles as the starting material. The recovery was almost the same as the amount of the non-crosslinked polymer particles used, indicating that the functional polymer particles were obtained in almost 100% yield.

Example 2

Preparation Example of Carboxyl Particles
Reaction for Introducing Functional Groups 10 g of the non-crosslinked polymer particle containing succinimidoxycarbonyl groups prepared in the same manner as in Example 1 and 200 ml hexane were introduced into a 500 ml beaker. While the mixture was stirred by a mechanical stirrer, 20 ml glutamic acid was added thereto and stirred for 30 minutes.

After reaction for 30 minutes, the particles were separated from the solution by a Kiriyama funnel (filter paper 5B). The particles and 100 ml hexane were introduced into a 500 ml beaker and stirred for 10 minutes, and the particles were washed on a filter. This washing was repeated twice.

The amount of carboxyl groups in the particles after introduction of the functional groups was determined to be 4.1 mmole/g. The functional polymer particle was thus obtained.

The number average particle diameter of the resulting functional polymer particles, the standard deviation as an indicator of the particle size distribution and the coefficient of variation were almost the same as those of the non-crosslinked polymer particles as the starting material. The recovery was almost the same as the amount of the non-crosslinked polymer particles used, indicating that the functional polymer particles were obtained in almost 100% yield.

Example 3

Preparation Example of Hydroxyl Particles
Reaction for Introducing Functional Groups 10 g of the non-crosslinked polymer particle containing succinimidoxycarbonyl groups prepared in the same manner as in Example 1 and 200 ml hexane were introduced into a 500 ml beaker. While the mixture was stirred by a mechanical stirrer, 20 ml ethanolamine was added thereto and stirred for 30 minutes.

After reaction for 30 minutes, the particles were separated from the solution by a Kiriyama funnel (filter paper 5B). The particles and 100 ml hexane were introduced into a 500 ml beaker and stirred for 10 minutes, and the particles were washed on a filter. This washing was repeated twice.

The amount of hydroxyl groups in the particles after introduction of the functional groups was determined to be 4.9 mmole/g. The functional polymer particles were thus obtained.

The number average particle diameter of the resulting functional polymer particles, the standard deviation as an indicator of the particle size distribution and the coefficient of variation were almost the same as those of the non-crosslinked polymer particles as the starting material. The recovery was almost the same as the amount of the non-crosslinked polymer particles used, indicating that the functional polymer particles were obtained in almost 100% yield.

Example 4

Preparation Example of Thiol Particles
Reaction for Introducing Functional Groups 10 g of the non-crosslinked polymer particle containing succinimidoxycarbonyl groups prepared in the same manner as in Example 1 and 200 ml hexane were introduced into a 500 ml beaker. While the mixture was stirred by a mechanical stirrer, 20 g of 2-aminoethane thiol was added thereto and stirred for 30 minutes.

After reaction for 30 minutes, the particles were separated from the solution by a Kiriyama funnel (filter paper 5B). The particles and 100 ml hexane were introduced into a 500 ml beaker and stirred for 10 minutes, and the particles were washed on a filter. This washing was repeated twice.

The amount of thiol groups in the particles after introduction of the functional groups was determined to be 3.8 mmole/g. The functional polymer particles were thus obtained.

The number average particle diameter of the resulting functional polymer particles, the standard deviation as an indicator of the particle size distribution and the coefficient of variation were almost the same as those of the non-crosslinked polymer particles as the starting material. The recovery was almost the same as the amount of the non-crosslinked polymer particles used, indicating that the functional polymer particles were obtained in almost 100% yield.

Example 5

Preparation Example of Maleimide Particles
Reaction for Introducing Functional Groups 10 g of the non-crosslinked polymer particle containing succinimidoxycarbonyl groups prepared in the same manner as in Example 1 and 200 ml hexane were introduced into a 500 ml beaker. While the mixture was stirred by a mechanical stirrer, 20 g of N-(4-aminophenyl) maleimide was added thereto and stirred for 30 minutes.

After reaction for 30 minutes, the particles were separated from the solution by a Kiriyama funnel (filter paper 5B). The particles and 100 ml hexane were introduced into a 500 ml beaker and stirred for 10 minutes, and the particles were washed on a filter. This washing was repeated twice.

The amount of maleimide groups in the particles after introduction of the functional groups was determined to be 2.7 mmole/g. The functional polymer particles were thus obtained.

The number average particle diameter of the resulting functional polymer particles, the standard deviation as an indicator of the particle size distribution and the coefficient of variation were almost the same as those of the non-crosslinked polymer particles as the starting material. The recovery was almost the same as the amount of the non-crosslinked polymer particles used, indicating that the functional polymer particles were obtained in almost 100% yield.

Comparative Example 1

Preparation Example of Hydroxyl Particles 100 g of 1% by mass of a polyvinyl alcohol solution, 23 g (90% by mole) of methyl methacrylate (MMA), 3.3 g (10% by mole) of methacrylic acid, azobisisobutyronitrile (AIBN) as an initiator, and 0.25 g of 2-hydroxyethyl methacrylate, were introduced into a stainless steel cup having a volume of 500 ml and then emulsified at 10,000 rpm with a homogenizer for 3 minutes to give an emulsion. Then, the emulsion was transferred to a separable four-necked flask of Pyrex (registered trade mark) glass having a volume of 300 ml, and a nitrogen gas was blown through a nitrogen gas inlet tube for 2 hours into the liquid phase under stirring, to remove oxygen dissolved therein. Then, the nitrogen gas inlet tube for the liquid phase was replaced by a nitrogen gas inlet tube for gas phase, and while a nitrogen gas was blown into it, the mixture was reacted for 16 hours at a reaction temperature of 60° C.

As a result, functional polymer particles of the number average particle diameter of 2.2 μm were obtained in a yield of 95% by mass. The standard deviation as an indicator of the particle size distribution and the coefficient of variation thereof of the polymer particles were as broad as 8.6 μm and 115%, respectively. The amount of hydroxyl groups in the particles was determined to be 0 mmole/g.

From these examples, it can be seen that non-crosslinked polymer particles having a succinimidoxycarbonyl group are reacted with a compound having a functional group and at least one functional group selected from the group consisting of a primary amino group and a secondary amino group, whereby functional polymer particles having a narrower particle size distribution can be obtained easily and more efficiently in the one-step process. It can also be seen that when the non-crosslinked polymer particles as the starting material are produced by the process described above, a fine spherical copolymer having an extremely narrow particle size distribution can be obtained in higher yield in the one-step process, and functional polymer particles having a narrower particle size distribution can be obtained more efficiently in higher yield.

According to the invention, there can be provided a method of producing a functional polymer particle wherein a functional polymer particle having functional groups, such as hydrophilic groups, can be obtained easily in high yield in a narrower particle size distribution.

What is claimed is:

1. A method of producing a functional polymer particle having at least one kind of functional group selected from the following structure group (A), the method comprising the step of reacting a non-crosslinked polymer particle, which includes a succinimidoxycarbonyl group represented by the following structural formula (B), with a compound, which includes at least one kind of functional group selected from the following structure group (A) and at least one functional group selected from the group consisting of a primary amino group and a secondary amino group:

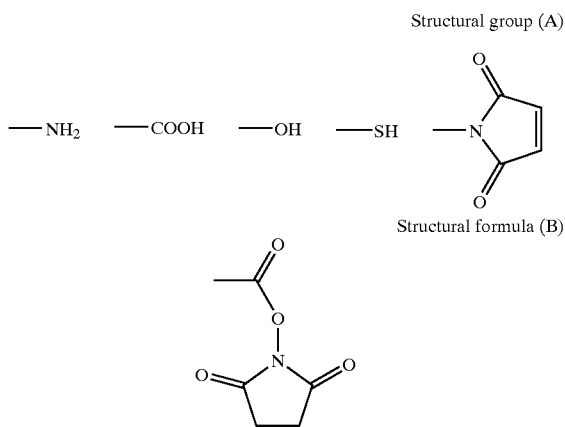

2. A method of producing a functional polymer particle according to claim 1, wherein reacting the compound, which includes at least one kind of functional group selected from the abovementioned structure group (A) and at least one functional group selected from the group consisting of a primary amino group and a secondary amino group, produces a functional polymer particle having a crosslinked structure.

3. A method of producing a functional polymer particle according to claim 1, wherein the step is carried out in at least one solvent selected from the group consisting of methanol, ethanol and hexane.

4. A method of producing a functional polymer particle according to claim 1, wherein the non-crosslinked polymer particle is produced by polymerizing 0.1 to 100% by mole of a polymerizable monomer (C), which contains a succinimidoxycarbonyl group represented by the abovementioned structural formula (B), and 99.9 to 0% by mole of a polymerizable monomer (D), which contains one polymerizable moiety in the monomer, by using a initiator in the presence of a macromolecular dispersion stabilizer in a non-aqueous solvent, and the non-aqueous solvent is a solvent in which the polymerizable monomer (C) and the polymerizable monomer (D) are soluble and the non-crosslinked polymer particle is insoluble.

5. A method of producing a functional polymer particle according to claim 4, wherein the polymerizable monomer (C) is at least one type selected from the group consisting of N-acryloxysuccinimide and N-methacryloxysuccinimide.

6. A method of producing a functional polymer particle according to claim 4, wherein the polymerizable monomer (D) is methyl methacrylate.

7. A method of producing a functional polymer particle according to claim 4, wherein the non-aqueous solvent is methanol.

8. A method of producing a functional polymer particle according to claim 4, wherein a weight average molecular weight of the macromolecular dispersion stabilizer is 10,000 to 2,000,000.

9. A method of producing a functional polymer particle according to claim 4, wherein the macromolecular dispersion stabilizer is at least one type selected from the group consisting of polyvinyl pyrrolidone, hydroxypropyl cellulose, polyvinyl acetamide, polyvinyl alkyl ether, polyvinyl alcohol and partially saponified polyvinyl acetate.

10. A method of producing a functional polymer particle according to claim 4, wherein a surface active agent is further added to the non-aqueous solvent.

11. A method of producing a functional polymer particle according to claim 4, wherein a redox type compound is further added to the non-aqueous solvent.

12. A method of producing a functional polymer particle according to claim 4, wherein an amount of the polymerizable monomer (C) is 0.1 to 50% by mole and an amount of the polymerizable monomer (D) is 99.9 to 50% by mole.

13. A method of producing a functional polymer particle according to claim 4, wherein an amount of the polymerizable monomer (C) is 0.1 to 20% by mole and an amount of the polymerizable monomer (D) is 99.9 to 80% by mole.

14. A method of producing a functional polymer particle according to claim 4, wherein the polymerization is carried out in an inert gas atmosphere.

15. A method of producing a functional polymer particle according to claim 4, wherein the polymerization is carried out at 50 to 100° C.

16. A method of producing a functional polymer particle according to claim 4, wherein the polymerizable monomer (C) is 10% by mole of N-acryloxysuccinimide, the polymerizable monomer (D) is 90% by mole of methyl methacrylate, the non-aqueous solvent is methanol, the macromolecular dispersion stabilizer is polyvinyl pyrrolidone, and the initiator is azobisisobutyronitrile.

17. A method of producing a functional polymer particle according to claim 1, wherein a number average particle diameter of the functional polymer particles is 0.01 to 50 μm, and a coefficient of variation of the number average particle diameter is 0.01 to 30%.

18. A method of producing a functional polymer particle according to claim 1, wherein a number average particle diameter of the functional polymer particles is 0.01 to 50 μm, and a coefficient of variation of the number average particle diameter is 0.01 to 10%.

19. A method of producing a functional polymer particle according to claim 1, wherein a number average particle diameter of the functional polymer particles is 0.01 to 50 μm, and a coefficient of variation of the number average particle diameter is 0.01 to 5%.

* * * * *